June 12, 1945.   M. G. JACOBSON   2,378,019
GAS TESTING METHOD AND APPARATUS
Filed May 28, 1940   3 Sheets-Sheet 1
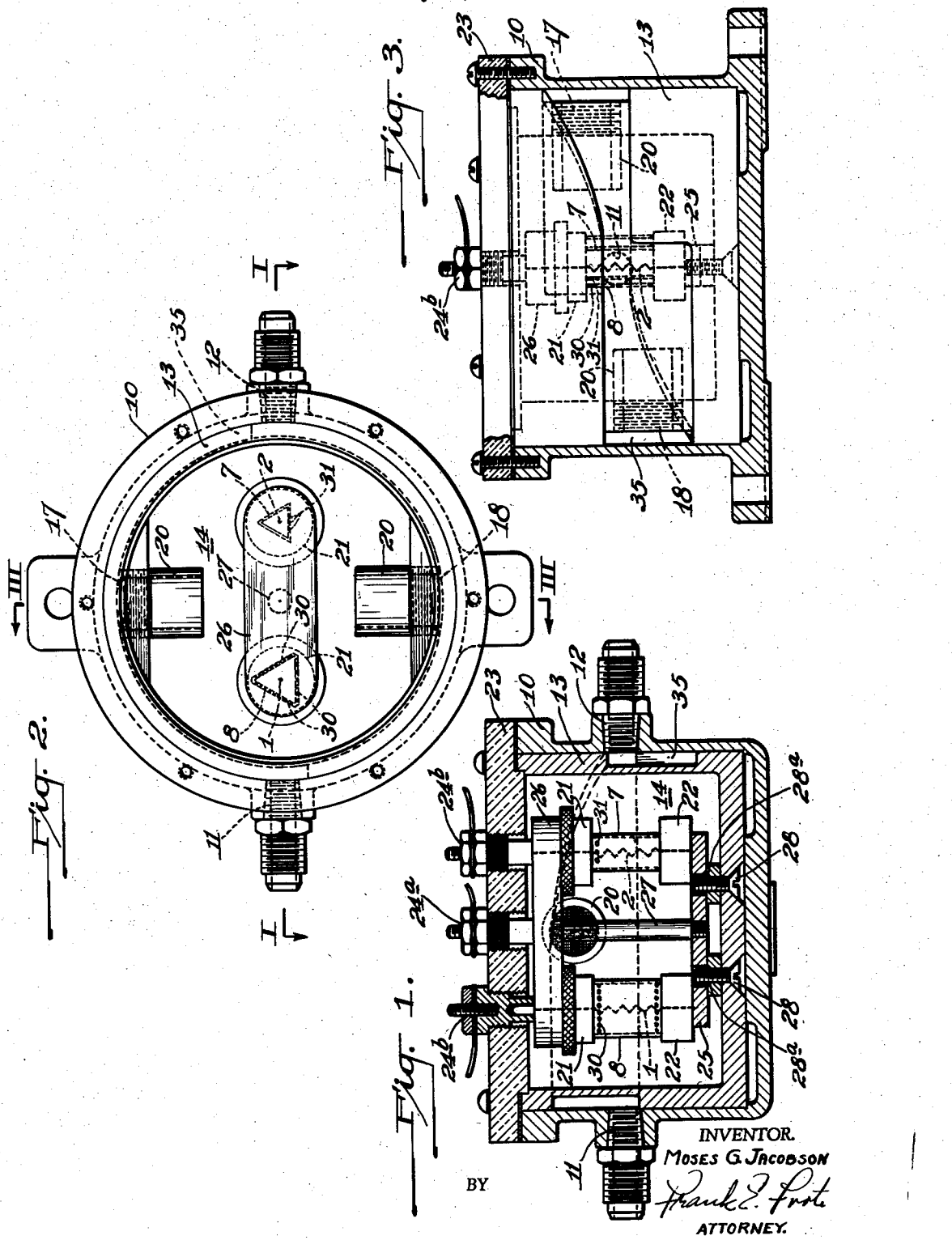
INVENTOR.
MOSES G. JACOBSON
BY Frank E. Frote
ATTORNEY.

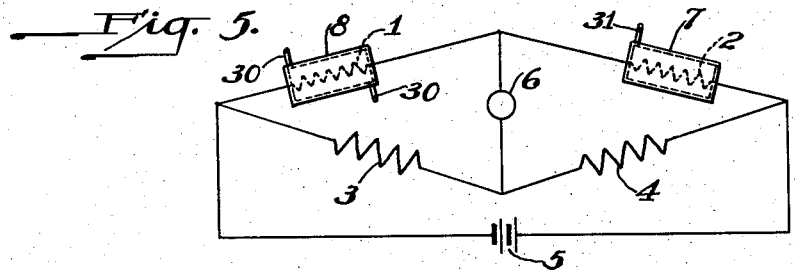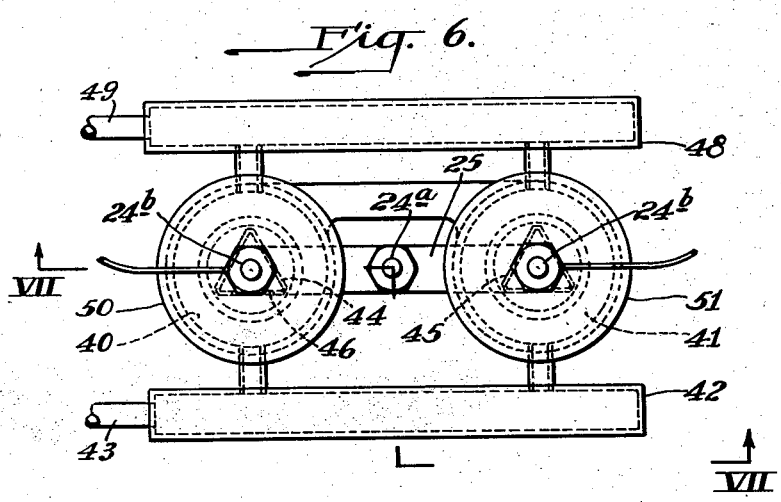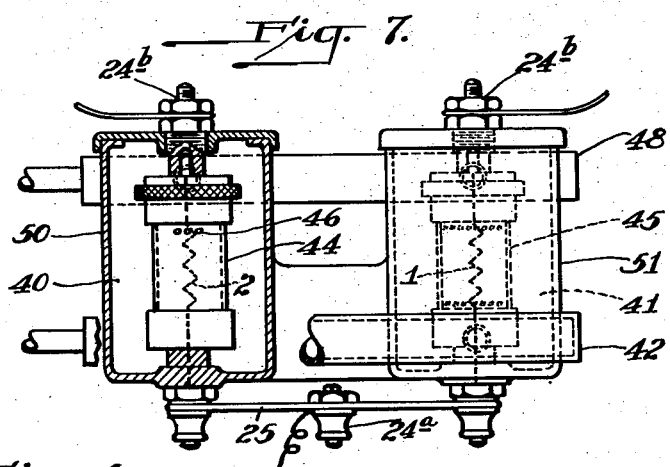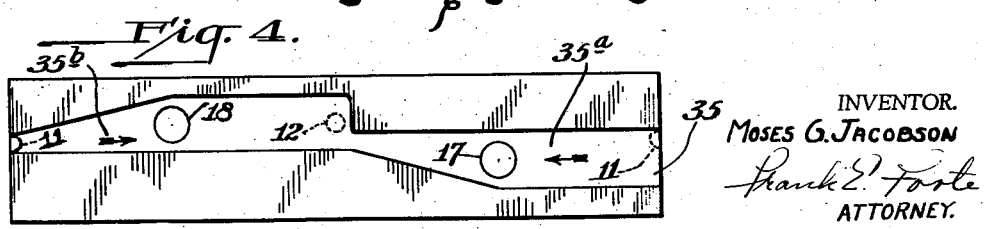

June 12, 1945.  M. G. JACOBSON  2,378,019
GAS TESTING METHOD AND APPARATUS
Filed May 28, 1940   3 Sheets-Sheet 3

INVENTOR.
MOSES G. JACOBSON
BY Frank E. Foote
ATTORNEY.

Patented June 12, 1945

2,378,019

UNITED STATES PATENT OFFICE 2,378,019

GAS TESTING METHOD AND APPARATUS

Moses G. Jacobson, Penn Township, Allegheny County, Pa., assignor to Mine Safety Appliances Company, Pittsburgh, Pa.

Application May 28, 1940, Serial No. 337,657

8 Claims. (Cl. 23—232)

This invention relates to a method and to an apparatus adaptable to detect the presence of and to indicate the extent of combustible gases and vapors in a mixture and is directed, more specifically, to an improvement of a method and apparatus which employs an electrically heated filament in oxidizing combustible gases and vapors and which is electrically responsive to the heat of oxidation or combustion.

A material limitation in the use of gas testing apparatus of this type heretofore available is that it is not adaptable in indicating the true extent of combustible gases and vapors in mixtures containing varying amounts of non-combustible vapors and gases such as water vapor, carbon dioxide and others which have a substantially different cooling effect on a heated filament than air. The filament is made usually of platinum and when surrounded by air and energized by an electric current is heated to a definite temperature. This temperature condition, by balancing an electric circuit in which the filament is included, is made to indicate a zero reading on a meter.

If current through the filament is maintained constant, the temperature of the filament also remains constant in an atmosphere in which no combustion occurs because for any given time the filament loses just as much heat as is produced by the current. This loss of heat in general occurs by metallic conduction from a filament to its supports, by radiation, by thermal conduction through the atmosphere surrounding the filament, by convection currents in the atmosphere, and, if as in most apparatus a gas sample to be tested is being pumped or otherwise moved to and from the filament, by direct transport of heat from the filament by the moving gas.

Changes in all these modes of heat loss produced by varying small amounts of combustible vapors and gases in a mixture are so small in comparison with the heat of combustion that they do not interfere materially with the determination of the concentration of combustibles in a mixture by means of temperature and consequent resistance rise of the filament and do not cause considerable deviations from proportionality between the indication produced and the actual concentration of combustibles present in the mixture. If, however, a gas sample with a low concentration of combustibles contains a considerably different amount of water vapor or carbon dioxide from that in the air used for establishing the zero setting, then the total heat loss, due substantially to thermal conduction, convection and direct transport by the moving gas, may be very large and may be even greater than the heat produced by oxidation of the combustibles. Consequently, the heat effect of oxidation of combustibles in the mixture being tested may be either entirely obliterated or a much too high indication obtained, depending on the content of the non-combustibles in the mixture relative to the amount present in establishing the zero setting of the meter. To illustrate, in a special combustible indicator with a full scale range of 1000 parts of benzol vapor per million parts of mixture, if a sample is admitted containing 100 parts of benzol per million and in addition having a 10% higher relative humidity than at the zero setting, the meter indication, instead of being at 100 on the scale, would be at or about zero, and if the sample should contain 200 parts per million, the indication would be at 100. Higher combustible concentrations in a sample would also be indicated 100 parts too low. To make an instrument of this kind at all usable, it has been, until now, customary to remove moisture by passing the sample as well as the air used for zero setting through a drying medium such as calcium chloride, activated alumina or the like, or through a water bubbler whose temperature is kept constant by means of a thermostat.

Aside from the inconvenience to the user, these methods of eliminating moisture by drying the sample are not always applicable because any available drying material would absorb some of the combustible vapors while absorbing water vapor or after the absorption of some water vapor. Obviously, this method cannot be used at all with alcohol and other water soluble combustibles.

It is one of the objects of this invention to provide a method and apparatus which renders practically complete compensation for the effect on a testing filament of water vapor in a gas sample, while testing a gas sample for combustible constituents, without employing drying, humidification or other treatment of the sample.

It is another object of this invention to provide a gas testing method and apparatus of the type contemplated and operative to compensate for the effects of carbon dioxide, helium and other similar inert gases and vapors which have considerable influence on the thermal losses of heated filaments.

A further object of this invention is to provide a method and apparatus which renders results in testing a gas sample substantially independent of pressure and temperature of a gas sample.

Other objects and features of this invention will become apparent from the following description.

In combustible gas indicators, it has been for some time the preferred practice to use two filaments, heated by the same electrical current in order to decrease the effects of variations and fluctuations in the power supply voltage. In order to have combustion only on the surface of the one filament, termed the active or detector filament, and to avoid the occurrence of combustion on the other filament, termed the compensator filament, the following two methods have been employed heretofore:

(1) The compensator is totally enclosed in a special housing or in a sealed gas-tight glass or metal tube; thus the filament is constantly surrounded by the same air and any part of the sample is prevented from reaching it.

(2) The compensator is open to the sample as much as the active filament but combustion on the surface is prevented by making the filament of a relatively large size of wire to reduce its resistance and thereby decrease its temperature below the surface combustion temperature, or by covering the surface of the filament with a negative catalyst or by a combination of both these means.

The first method provides very good compensation for voltage changes, but so far as compensation for the effect of variations in the content of water vapor, carbon dioxide or other non-combustible constituents in the sample is concerned relative to the atmosphere used in establishing the zero setting, which is the principal feature of the present invention, this method does not provide any compensation at all.

The second method to some extent does provide compensation for the effect of water vapor, carbon dioxide, and other similar gases on a testing filament, inasmuch as they do reach the compensator filament and produce some effect on its electrical resistance, and this counteracts the effects of the same constituents on the active filament. But, since this effect is due to heat lost by thermal conductivity, convection and direct heat transport by the gas flow (in cases where the sample has considerable motion), compensation by a filament of different temperature and/or with a different surface, obviously is very far from being complete. In addition, this second method introduces an undesirable feature wherein the active filament in this arrangement, even in the absence of combustibles in the sample, has a much higher rate of evaporation from the surface than the compensator filament so that in a comparatively short time the resistance of the active filament relative to that of the compensating filament is changed. Consequently, the Wheatstone bridge or other electrical circuits in which the filaments are included must be rebalanced at frequent intervals.

The present invention avoids all of the disadvantages of the above methods. In distinction from the above method number one, the compensator is not sealed in, but is open to the sample. In distinction from method number two, the compensator filament is not made of a different material or with a different surface, but it is substantially similar to the active filament and it is not open to the sample flow to the same extent as the active filament but to a much smaller extent.

I have found that every active filament has a maximum rate of combustion possible on its surface, and this maximum rate of combustion is dependent substantially on the character and magnitude of the surface, on its temperature and on the heat loss conditions. In order to obtain the maximum possible sensitivity of the active filament, the sample should be conveyed to the filament at a rate at least sufficient to replenish the combustibles at the surface of the filament as fast as they are oxidized. If the sample is conveyed at a rate higher than the highest combustion rate of a given filament, no increase in the heat evolved and no further temperature rise occurs above that produced by the maximum rate of combustion. At a sufficiently increased sample flow over the maximum rate, the temperature begins to decrease, due to increased cooling by heat transport, but if the sample reaches the filament at a smaller rate than the above maximum, the heat evolved and the temperature rise is smaller.

I have found, when the rate at which the sample containing combustibles reaches the filament is cut down to such an extent that only less than 1% of the maximum combustion and temperature rise occurs, that it is possible to arrange matters in such a way that equalization occurs in the content of water vapor, carbon dioxide, etc., after admission of a new sample and with a lag of only one minute or less. To achieve this, the detector and compensator filaments may be located in separate compartments and the sample flow to the compensator filament cut down by means of a restriction or by-pass. With this arrangement, the velocity of the gas sample moving past the detector filament is much higher than the gas velocity at the compensator, and consequently, the portion of the heat loss to each of the filaments due to direct heat transport by the sample is different. In order to obtain complete compensation against influences of water vapor, it is necessary to slow down the motion of the sample past the detector by providing a much larger container for the detector filament. However, with this arrangement it is not easy to balance out completely the difference in the amounts of heat lost from the two filaments because the convection losses in turn are dependent on transverse dimensions of the enclosures. To obtain more complete equalization, it is helpful to make the wall of the detector enclosure thicker than that of the compensator enclosure, and the heat loss from the detector filament is decreased further.

In the preferred embodiment of my invention, which is described hereinafter in detail, full equalization or compensation for heat loss from an energized testing filament is accomplished by locating the testing or detector filament and a compensating filament, which is of like construction, in separate enclosures and by allowing the sample to penetrate through the enclosure to each filament substantially by diffusion only, thereby eliminating for both of them the heat losses due to transport by the moving gas. To obtain a high rate of sample penetration to the testing filament necessary for a high rate of combustion, the enclosure of the filament is preferably provided with a large number of small openings or with a permeable membrane having a large open surface. To starve the compensator filament of combustibles the enclosure surrounding the filament is provided only with a few small openings or with a permeable membrane of a very small open surface. With this arrangement, the rate of flow or the amount of combustibles penetrating to the compensator filament during an interval of time is only a small fraction of the maximum amount that could be burned or oxidized by this filament and which is burned simultaneously by the otherwise similar testing filament, subjected to substantially its maximum rate of flow of combustibles. Also, water vapor, carbon dioxide and other non-combustible constituents in the gas sample penetrate to the compensator filament much slower than to the detector filament, but since they are not consumed like combustibles, the only consequence is a time lag in the procurement of full compensation for their presence and effect.

This time lag, however, being of the order of a few minutes, is sufficiently small so as not to be objectionable in most practical applications. If desired, the lag can be reduced to a fraction of a minute by increasing the rate of admittance of the sample to the compensator filament, which increases the penetration of both the non-combustible and the combustible components to the filament, and thus the decrease in the time lag of equalization is accompanied by a sacrifice in sensitivity of 10 to 20 percent. Another means of decreasing this time lag, and which can be accomplished substantially without a loss in sensitivity, is to make the enclosure with few small openings which surrounds the compensator filament of a smaller cross sectional or transverse area than the enclosure of the detector filament with a larger number of openings. This arrangement serves to decrease the volume of the enclosure and enables it to be filled with a fresh sample in less time. In addition, the transfer of heat from the filament to the wall is accelerated and increased by placing the enclosure wall through which the heat is finally conveyed to the outside nearer to the filament, because in our preferred embodiment heretofore described the heat from the filaments is lost substantially by convection currents. In using this method of compensation for the heat losses occurring at the testing filament, the cross sectional size of the compensating filament enclosure should not be smaller than one quarter of an inch (¼"), because, if made smaller, the transfer of heat by convection currents would be greatly impeded.

Should a small inequality in heat loss by the two filaments still exists when using the above method and apparatus, this can be equalized by making the walls of the enclosures of the filaments of different thickness or by using materials having different thermal conductivities.

It is recognized that many other applications and modifications may be made of my invention, and it is intended that the invention should include all applications and modifications within its scope. For the purpose of disclosing fully my invention, two embodiments and a modification of each are described in detail and illustrated in the drawings. It is understood that any disclosure as to the theory of operation is not to be considered a limitation of the invention, but such is made for the purpose of being helpful in understanding what is thought to be the operation and the significance of parts or elements and the arrangement thereof included in the embodiment.

In the drawings:

Fig. 1 is a sectional view of the preferred embodiment taken along the line I—I of Fig. 2 and in which the testing units are illustrated in full.

Fig. 2 is a plan view of the same embodiment.

Fig. 3 is a sectional view of the outside casing along the line III—III of Fig. 2 and in which the inside thereof is shown in full to illustrate the ports and passages formed between elements of the apparatus.

Fig. 4 is a full development of the port and passages formed between elements of the apparatus and illustrated in part in Fig. 3.

Fig. 5 is a diagrammatic illustration of a balanced bridge circuit which may be used in connection with this apparatus.

Fig. 6 is a plan view partly in section of another embodiment of my invention.

Fig. 7 is a section view of the embodiment illustrated in Fig. 6 and taken along the line VII—VII of Fig. 6.

Figure 8:
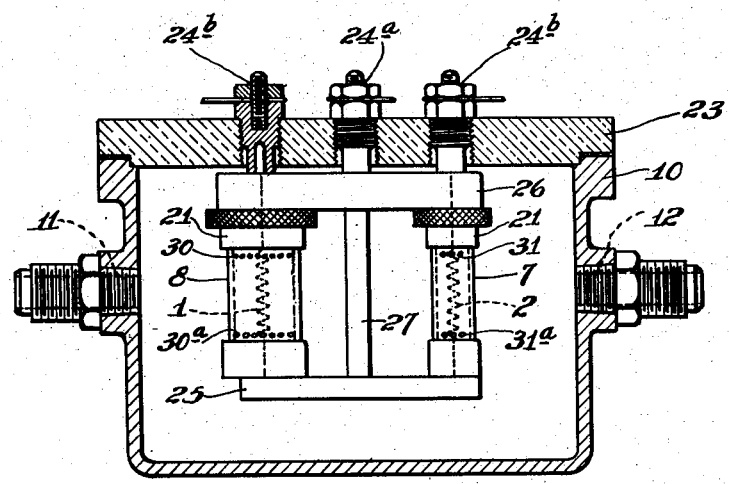
Figures 8 and 9 are illustrations of modifications employing filament enclosures of different sizes.

For the purpose of describing my invention, an electrically responsive circuit such as illustrated in Fig. 5 may be used and in which a detector or testing filament 1 is connected in series with a compensating filament 2 and both are arranged in a Wheatstone bridge assembly, which is composed further of fixed resistances 3 and 4, a source of energy represented as battery 5 and an electrical indicating meter 6. Any increase in resistance of the filament 1 will cause a deflection of the pointer of meter 6. An equal increase in resistance of filament 2 will cause an equal and opposite deflection of meter 6. Simultaneous and equal increases in the resistance of both filaments will cause a balance and leave the position of the meter pointer unaffected.

Figures 1 to 4 illustrate a preferred embodiment of the apparatus which is adapted to provide the low pressure difference between the inlet and outlet of the testing chamber to create and maintain a low gas velocity in the vicinity of the testing filaments. An outer cylindrical housing member 10, provided with an inlet 11 and an outlet 12, has an inner surface engaging an outer surface of a concentric inner housing member 13, which has a two way channel 35 formed in its outer surface and connected to the openings in the housing 10 to provide for a comparatively large gas flow through the apparatus between openings 11 and 12, while the flow through the interior of chamber 13 is as low as desired. The inner housing 13 defines a testing chamber 14 in which are inserted the testing filament 1 and the compensator filament 2.

The apparatus is illustrated as being cylindrical in contour but other shapes can be used as well as different arrangements of the two cooperating members which define a passage and a testing chamber. A suitable design of a two way channel is illustrated in Fig. 4 in developed form showing the two semi-circular paths 35a and 35b of channel 35 connected to inlet 11 of housing 10 to be connected to a sampling line and outlet 12, and inlet 17 and outlet 18 of housing 13 which connects the testing chamber 14 to both paths of the channel 35. The gas entering at 11 moves simultaneously along the two semi-circular paths 35a and 35b of the channel 35 which are reunited again at the outlet 12. The portion of channel 35a is so constructed that little resistance is offered to the movement of gas in the direction from 11 to the inlet opening 17 of the inner housing 13, while movement of the gas in 35b from 11 to 18 is somewhat restricted by the constriction of the channel as illustrated on the left side of Fig. 4, so that some pressure difference is established between the inlet opening 17 and the outlet opening 18 of the housing 13. In this way, a small part of the gas stream moving in 35a passes through 17 into the testing chamber where it moves with very low linear velocity and after contacting the filaments 1 and 2, it passes through opening 18 to join the stream of gas moving in 35b. This flow system is a novel adaptation of the aerodynamical Wheatstone bridge flow system described in my U. S. Patent No. 2,149,441 issued on March 7, 1939. It is apparent that modifications can be made in the construction of the flow system which will produce in other ways a very small pressure difference between the inlet and outlet openings of a testing chamber so as to cause an extremely slow movement of gas through the chamber.

A cap 23 seals off the open ends of each of the housing members and it can be of an insulating material such as a resinous material or hard rubber. Flash back arrestors 20 are inserted in the openings of the inner housing 13 in order to prevent any explosion carrying beyond the testing chamber 14.

Each of the filaments 1 and 2, which are to be of platinum or any other suitable metal, is suspended from the cap and between an upper base portion 21 and a lower base portion 22. The shields or enclosures 7 and 8 of thin metal foil are connected to the base portions by soldering or welding or any other suitable method and in a gas-tight manner so as to define inner isolated cells in which the filaments are positioned. The lower terminals of these filaments are electrically connected together by a tie bar 25, and a rigid upper support 26 is used for spacing and supporting the filaments in their operating condition. This support 26 is made of some insulating material or of metal with insulating bushings surrounding the filaments, and it also serves to support the rod 27, which is attached to the connector bar 25 between the connections of the filaments thereto, and it has a terminal post 24a to be connected to an electric meter 6, Fig. 5. Each of the filaments has a terminal post 24b for connecting the filaments into an electric circuit, such as shown in Fig. 5. Openings 28a in the bar 25 are made larger than pins 28, which are rigidly connected to the bottom of housing 13, and serve to locate and keep the filaments in the housing with relation to the openings 17 and 18.

The shield or enclosure 8 of the testing filament 1 is represented as triangular in cross section, but not to be limited by such representation, and contains a series of openings 30 in the top portion and in the bottom portion and which should be of sufficient number to allow the passage into and out of the cell, defined by the shield, of all or nearly all the gas that the filament is able to burn during a unit interval of time. The shield 7 of the compensator filament 2 is of a contour similar to that of shield 8 but, preferably, of smaller cross section and defining a cell having a volume smaller than the volume of shield 8 and contains a limited number of openings 31 adjacent the upper base portion 21.

The shields or enclosures can be made of any material which is not reactive with gases to be tested, and in one arrangement they are made of cadmium plated copper foil shaped in the form of triangular prisms. The lateral sides of the shield 8 for the testing filament are ½ inch in width and ⅝ inch in length and .005 inch thick for the testing filament, and the sides of the shield 7 for the compensator filament are ⅜ inch in width and ⅝ inch in length and .003 inch thick.

The size of the openings used to introduce the mixture to the filaments is twenty thousandths of one inch (0.020") in diameter, and sixty (60) of these openings are used in each end portion of the testing filament shield 8, making a total of 120 openings in the shield, while a total of three of such openings are used in the shield 7 of the compensating filament and all are placed in one end portion of the shield, as illustrated in Figures 1 and 2.

With the apparatus as described, a large gas flow of the order of ½ to 1 cubic foot per minute can be maintained through the channel 35 from inlet 11 to outlet 12 of housing 10, thus carrying the sample to the vicinity of the filament even from distant sampling places in a very short time, and with this flow, a gas flow of the order of only one to two hundredths of a cubic foot or 280 to 560 c. c. (cubic centimeters) per minute takes place through the inner or testing chamber 14. The free space or available volume of this chamber 14 is made preferably of the order of 100 c. c. and all of the transverse dimensions defining this volume should be made comparatively large as diagrammatically shown on the drawings whereby the linear velocity or movement of gas from a sampling line in and through the testing chamber is very low because the pressure differential on opposite sides of the testing filament enclosure relative to the direction of flow through the chamber 14 is too small to cause a flow of gas of any material consequence through this enclosure. Therefore, the filaments are reached by the gas mixture substantially by diffusion and by draft due to combustion occurring within the shield 8.

Another embodiment of my invention is illustrated in Figures 6 and 7. Similar elements are designated by like characters. In this embodiment, the filaments 1 and 2 surrounded by enclosures or shields 44 and 45 represented as triangular in shape but not to be limited thereto are placed in separate testing chambers 40 and 41 defined by containers 50 and 51, respectively. The gas flows into the lower header 42, which is connected to each of the chambers 40 and 41 so that the gas passes first into the lower extremity in each of the chambers. The filaments may be assembled in a manner such as described in connection with the embodiment illustrated in Fig. 1. Each of the filaments is connected electrically to the cross bar 25 having electrical terminal 24a and each of the filaments 1 and 2 has connected thereto a terminal 24b for connecting the circuit to a source of energy and for incorporating the circuit into a balanced circuit arrangement. The shield 44 surrounding the compensator filament 2 has a passage 46 which may consist of small openings formed in its upper portion and only on one side of the triangular shape, while the shield 45 surrounding the testing filament 1 has a larger opening or a plurality of similar openings located in the extremities of the shield and on each side of the triangular shield to allow the gas to pass more freely into and out of the inner cell defined by the shield. The openings in the shield 44 can be located in both the upper and lower end portions of the shield, but in any event the passage to filament 2 is to be much more restricted than the passage to the testing filament 1.

This modification may be used to advantage in cases when the sample does not have to be drawn from a great distance and, therefore, can be passed into the inlet 43 of header 42 at a small rate of flow, or when the inlet 43 and the outlet 49 are connected directly to two openings of a main pipe line which are not spaced far apart. The linear velocity of the gas motion would be small through chambers 40 and 41 and would be further decreased on the inside of the enclosures 44 and 45 near the filaments 1 and 2.

Figure 9:
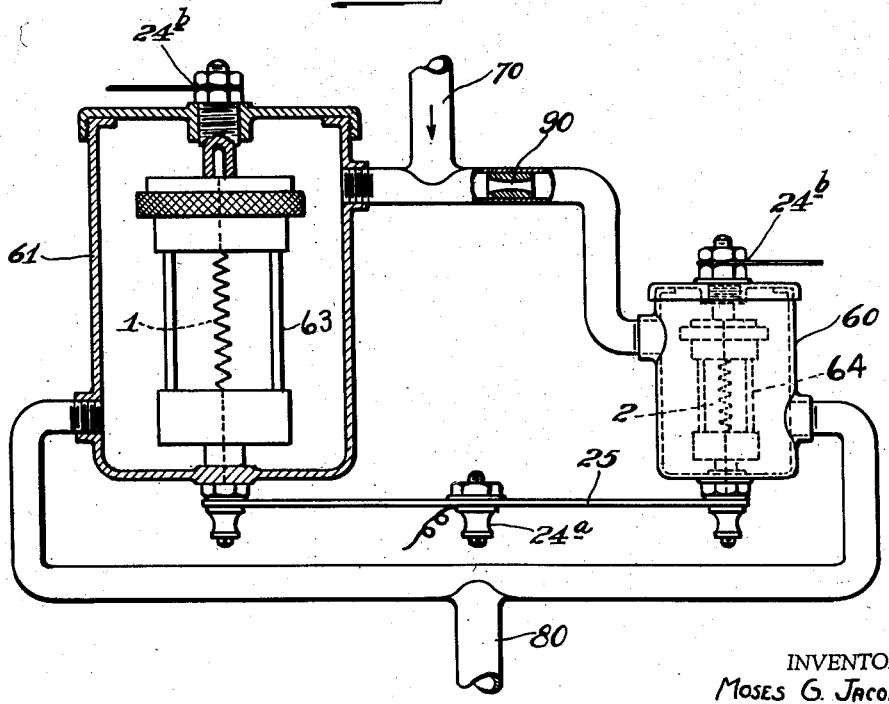

Figures 8 and 9 are modifications illustrating the method by which an equal linear velocity of gas motion can be obtained near the compensating filament in spite of a much lower rate of volumetric flow. In Fig. 8, the two filament enclosures 7 and 8 of Fig. 1 are disposed in the single housing 10 in place of the two concentric housings illustrated in Figures 1 and 3. The main purpose of the concentric housings, as set forth above, is to decrease the gas flow to such an amount that the linear motion of the gas through the filament enclosures will be entirely negligible in comparison with motion of the gas due to diffusion and convection. In this modification, Figures 8 and 9, instead of decreasing the gas flow due to pressure differential past the filament to near zero, velocity of the gas motion past the compensator filament 2 is made substantially equal to the gas velocity past the testing filament 1 by constructing the compensator shield 7 with (3) small openings 31 in the top portion and three (3) openings 31a in the bottom portion as illustrated compared to thirty (30) or more openings 30 and 30a in each similar portion of the detector shield 8 and which constricts the flow through the compensator enclosure to about one tenth ($\frac{1}{10}$) of that which is flowing through the testing filament enclosure. At the same time, by making the diameter of enclosure 7 about three and two tenths (3.2) times smaller than that of enclosure 8, the linear velocity in 7 is increased ten (10) times and hence the net linear gas velocity in 7 is equal to that in 8 while the rate of volumetric flow is ten (10) times smaller.

Similarly, in the modification shown in Fig. 9, the linear velocity of the gas past the two filaments is made equal, while the rate of volumetric flow past the compensator filament 2 is greatly decreased. In this modification an inlet 70 and an outlet 80 are connected to an enclosure 61 around the detector filament 1, and an enclosure 60 around the compensator filament 2. Spacer rods 63 and 64 of filaments 1 and 2, respectively, are used and the filaments are open to the mixture passing into the enclosures of each filament. The decrease of rate of flow past filament 2 is accomplished by means of a flow resistance or constriction 90 in the inlet to the enclosure 60, and equalization of the linear velocity through this enclosure with that through enclosure 61 is obtained by making the area of enclosure 60 sufficiently large relative to enclosure 61 to accommodate a larger volumetric flow and at a linear velocity similar in both enclosures. The wall of enclosure 60 is made preferably of thinner material than the wall of enclosure 61 in order to provide an additional small heat loss from filament 2 to balance out any small remaining inequality with respect to the net heat loss of filament 1. This same construction may be used in the embodiment of Fig. 8 wherein shield 8 is made of heavier material than shield 7. The two filaments (Fig. 9) are shown to be of different lengths to indicate that some compensation can be provided for the presence of and amount of non-combustibles in the gas mixture on the testing filament by making the filament of different lengths, and further compensation can be provided by making the filaments of different material. However, it is much easier and more adaptable to obtain a good balance against disturbance by non-combustible materials by making both filaments of the same material, having the same diameter and not differing very much in total length, diameter of coiling and in the spacing of the adjacent windings. The simplest and most practical arrangement is to have both filaments identical and, therefore, this is used in the preferred embodiment described above.

Many more embodiments of this invention can be made and the embodiments and modifications described above serve to explain the principles and mode of operation of my invention, and it is intended that the invention is to be limited only by the scope of the appended claims.

I claim:

1. In a method of gas testing in which gas containing a combustible constituent is passed over a substantially identical pair of heated filaments operated at a temperature which is sufficiently high to induce combustion of said constituent and which is substantially the same for both filaments, one of said filaments acting as a testing filament and the other as a compensating filament, the method of decreasing the disturbing effects of non-combustible constituents which comprises passing the gas to be tested over each of said filaments at a different rate of flow, the rate of flow to the testing filament being substantially equal to the maximum rate of combustion possible at its surface, and the rate of flow to the compensating filament being a fraction of the maximum rate of combustion possible at its surface.

2. In a method of gas testing in which gas containing a combustible constituent is passed over a substantially identical pair of heated filaments operated at a temperature which is sufficiently high to induce combustion of said constituent and which is substantially the same for both filaments, one of said filaments acting as a testing filament and the other as a compensating filament, and said filaments being enclosed in separate containers of a size to permit a considerable rate of gas flow therethrough at relatively low linear velocities, the method of eliminating disturbing effects of non-combustible constituents which comprises passing the gas sample into the container surrounding the testing filament at a relatively high rate permitting a relatively high rate of combustion at the filament, and passing the gas sample into the container surrounding the compensating filament at a relatively low rate productive of combustion at the compensating filament at only a small fraction of the amount of combustion at said testing filament.

3. In a method of gas testing in which gas containing a combustible constituent is passed over a substantially identical pair of heated filaments operated at a temperature which is sufficiently high to induce combustion of said constituent and which is substantially the same for both filaments, one of said filaments acting as a testing filament and the other as a compensating filament, said filaments being connected in a balanced electrical circuit, the testing filament being enclosed in a container providing a space of predetermined size surrounding the filament, and the compensating filament being enclosed in a separate container which defines a space of relatively smaller size than said predetermined size surrounding the filament, the method of eliminating disturbing effects of non-combustible constituents which comprises passing the gas sample through the space surrounding the testing filament at a relatively high rate sufficient to maintain a substantial rate of combustion at the filament and passing the gas sample through the space surrounding the compensating filament at a greatly decreased rate of flow and at a linear velocity substantially equal to the velocity of the gas sample in the space surrounding the testing filament whereby combustion at said compensating filament is only a small fraction of the combustion at said testing filament.

4. In a method of gas testing in which gas containing a combustible constituent is passed over a substantially identical pair of heated filaments operated at a temperature which is sufficiently high to induce combustion of said constituent and which is substantially the same for both filaments, one of said filaments acting as a testing filament and the other as a compensating filament, the testing filament being disposed within a container a large portion of which is diffusively permeable by gas, and the compensating filament being disposed within a container a small part of which is diffusively permeable by gas, the method of eliminating disturbing effects of non-combustible constituents which comprises passing the gas to be tested into contact with said containers at a rate sufficient to maintain the composition of the sample substantially constant against changes caused by combustion at said filaments.

5. In a method of gas testing in which gas containing a combustible constituent is passed over a substantially identical pair of heated filaments operated at a temperature which is sufficiently high to induce combustion of said constituent and which is substantially the same for both filaments, one of said filaments acting as a testing filament and the other as a compensating filament, said filaments being disposed in separate containers and electrically connected in a balanced electrical circuit, the method of decreasing disturbing effects of non-combustible constituents which comprises passing the gas sample to the testing filament at a relatively high rate sufficient for complete combustion at said filament, restricting the flow of the gas to the compensating filament container so that admittance of the gas to the filament is principally by diffusion and at a relatively low rate insufficient to maintain considerable combustion, and controlling the flow of the gas to said filaments at a rate sufficient to maintain the composition of the gas in the vicinity of said filaments substantially constant.

6. In a combustible gas testing apparatus, the combination of a pair of substantially identical filaments adapted to cause combustion at their surfaces when heated, one of said filaments acting as the testing filament and the other as the compensating filament, electrical means associated with said filaments for heating them to substantially the same temperature, separate containers each enclosing one of said filaments, the testing filament enclosure being provided with a large number of relatively small apertures, the compensating filament enclosure being provided with a relatively small number of small apertures, and a container surrounding said enclosures and providing a gas space therearound, said container being provided with inlet and outlet ports for passing gas through said space in contact with said enclosures.

7. In a combustible gas testing apparatus, the combination of a hollow container member provided with a removable closure and with inlet and outlet ports, an inner hollow member disposed within said container with its outer surface in sealing engagement with the inner surface of said container, one of said members being provided with a channel forming a passage between said members connecting said ports, said inner member being likewise provided with inlet and outlet ports open to said channel, a testing filament and a substantially identical compensating filament each adapted to cause combustion at the surface when heated mounted within said inner member, electrical means connected to said filaments for heating them to substantially the same temperature, an enclosure provided with a large number of apertures surrounding the testing filament, and an enclosure provided with a relatively small number of apertures surrounding the compensating filament.

8. An apparatus according to claim 7, said channel being continuous, the inlet to said inner member being open to said channel between the container inlet and outlet, the outlet from said inner member being open to said channel between the container outlet and inlet, and the channel being provided with flow resistance to cause a portion of gas flowing through the channel from the inlet to the outlet part of the container to be diverted to and move through said inner member at low linear velocity.

MOSES G. JACOBSON.